(12) United States Patent
Igarashi et al.

(10) Patent No.: US 7,147,299 B2
(45) Date of Patent: Dec. 12, 2006

(54) CONTROL UNIT AND METHOD FOR CONTROLLING MOTOR FOR USE IN PRINTER, AND STORAGE MEDIUM STORING CONTROL PROGRAM

(75) Inventors: Hitoshi Igarashi, Nagano-Ken (JP); Masanori Yoshida, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/071,450

(22) Filed: Mar. 4, 2005

(65) Prior Publication Data
US 2005/0146555 A1 Jul. 7, 2005

Related U.S. Application Data

(63) Continuation of application No. 09/667,300, filed on Sep. 25, 2000, now Pat. No. 6,877,837.

(30) Foreign Application Priority Data

| Sep. 28, 1999 | (JP) | ............................. 1999-274806 |
| Jun. 5, 2000 | (JP) | ............................. 2000-167930 |

(51) Int. Cl.
*B41J 23/00* (2006.01)
*B41J 19/00* (2006.01)
*G01B 5/01* (2006.01)
*G05G 5/00* (2006.01)
*B64C 17/02* (2006.01)

(52) U.S. Cl. .................. 347/37; 400/283; 318/616; 318/626; 318/648

(58) Field of Classification Search ............. 347/37
See application file for complete search history.

(56) References Cited

U.S. PATENT DOCUMENTS

| 3,931,562 A | 1/1976 | Visscher |
| 4,558,265 A | 12/1985 | Hayashida et al. |
| 5,159,254 A | 10/1992 | Teshima |
| 5,475,291 A * | 12/1995 | Yoshida et al. ............. 318/610 |
| 5,871,291 A | 2/1999 | Kawazoe |

FOREIGN PATENT DOCUMENTS

| EP | 659 572 A2 | 6/1995 |
| JP | 56012898 | 2/1981 |
| JP | 02078557 | 3/1990 |
| JP | 04-071381 A | 3/1992 |
| JP | 04-335410 A | 11/1992 |

(Continued)

OTHER PUBLICATIONS

Japanese Office Action mailed Jul. 8, 2005 in Japanese Patent Application No. 2000-167930.

*Primary Examiner*—Julian D. Huffman
(74) *Attorney, Agent, or Firm*—Sughrue Mion, PLLC (57) ABSTRACT

There is provided a control unit capable of rapid and precise stoppage of an object to be driven by a motor for use in a printer. The control unit has a speed control part to control the object by acceleration control, constant speed control, deceleration control, and stoppage control by controlling a current to be applied to the motor, and also an inertia calculating part to calculate inertia of the object based on angular acceleration of the motor under the acceleration control of the object, and current values to be applied to the motor under the acceleration control and the constant speed control of the object. The speed control part uses the calculated inertia for controlling the current to be applied to the motor.

18 Claims, 9 Drawing Sheets

FOREIGN PATENT DOCUMENTS

| | | |
|---|---|---|
| JP | 08-015058 A | 1/1996 |
| JP | 11020143 | 1/1999 |

\* cited by examiner

CONTROL UNIT AND METHOD FOR CONTROLLING MOTOR FOR USE IN PRINTER, AND STORAGE MEDIUM STORING CONTROL PROGRAM

This is a continuation of application Ser. No. 09/667,300 filed Sep. 25, 2000 now U.S. Pat. No. 6,877,837, which is incorporated herein by reference.

BACKGROUND OF THE INVENTION

1. Field of the Invention

The present invention relates generally to a control unit and method for controlling a motor for use in a printer, and a storage medium storing a control program. More specifically, the invention is used for controlling the speed of a motor for driving a carriage of a serial printer.

2. Description of Related Art

In a typical serial printer such as an ink jet printer, a recording head scans on a printing paper to print. This recording head is fixed to a carriage to move with the carriage. This carriage is driven by a DC (Direct Current) motor. The system for driving the carriage is as follows.

First, a CR motor starts by acceleration control. The CR motor is driven at a constant speed by PID control. Then, the CR motor decelerates to stop.

A printing operation is executed while a carriage is transferring at a constant speed, or the CR motor is driven at the constant speed.

PID control is performed based on a deviation of a counted value of the output pulses of an encoder rotating in accordance with the rotation of the CR motor from a target position (target number of pulses).

The carriage will stop, however, at a position apart from the target position due to change in carriage inertia (moment of inertia), loads, motor currents, and so on. A special control (logical seek) is required to stop the carriage at the target position. Such a control is very complex and takes long.

SUMMARY OF THE INVENTION

It is therefore an object of the present invention to eliminate the aforementioned problems and to provide a control unit, a method, and a storage medium having a control program recorded therein for always precisely stopping an object driven by a motor for use in a printer at a target position.

In order to accomplish the aforementioned and other objects, according to one aspect of the present invention, there is provided a control unit for controlling a motor for use in a printer, including: a speed control part to control an object to be controlled that is driven by the motor by acceleration control, constant speed control, deceleration control, and stoppage control by controlling a current to be applied to the motor; and an inertia calculating part to calculate inertia of the object based on angular acceleration of the motor under the acceleration control of the object, and current values to be applied to the motor under the acceleration control and the constant speed control of the object, the calculated inertia being used by the speed control part for controlling the current to be applied to the motor.

The control unit may further include a stoppage current calculating part to calculate a stoppage current to be used for stopping the object at a target position based on the calculated inertia, an angular velocity of the motor under the deceleration control of the object, the current value of the motor under the constant speed control of the object, and a stoppage constant $T_{BRK}$, the speed control part performing control of stopping the object by applying the calculated stoppage current.

It is preferable that a predetermined current value Iacc is applied to the motor in a constant current acceleration range under the acceleration control for accelerating the object, the inertia calculation part calculating angular acceleration $\Delta\omega/\Delta t$ in the constant current acceleration range, and calculating inertia J of the object based on the angular acceleration $\Delta\omega/\Delta t$, a current value $I_f$ to be applied to the motor under the constant speed control of the object, and the current value Iacc.

It is preferable that the current value $I_f$ corresponds to a speed of the object under constant speed control just before a transition from the constant speed control to the deceleration control.

The stoppage current calculating part may use an angular velocity under deceleration control just before a transition from the deceleration control to the stoppage control, as the angular velocity of the motor.

The control unit may further include a period measuring part to measure a period of each output pulse of an encoder that rotates in accordance with rotation of the motor, the angular acceleration and the angular velocity of the motor being calculated based on the output of the period measuring part.

The stoppage constant $T_{BRK}$ may be decided based on the current value to be applied motor under the constant speed control and a positional deviation of an actual position of the motor from the target position.

Moreover, the present invention provides a method of controlling a motor for use in a printer, including the steps of: calculating inertia of an object to be driven by the motor based on angular acceleration of the motor under acceleration control of the object, and current values to be applied to the motor under the acceleration control and the constant speed control of the object; and controlling a current to be applied to the motor by means of the calculated inertia.

The step of controlling the current may include the steps of: calculating a stoppage current to be used for stopping the object at a target position based on the calculated inertia, an angular velocity of the motor under deceleration control of the object, the current value of the motor under the constant speed control of the object, and a stoppage constant $T_{BRK}$; and stopping the object by applying the calculated stoppage current to the motor.

Furthermore, the present invention provides a computer-readable storage medium storing control program code for controlling a motor for use in a printer, including: first program code means for calculating inertia of a carriage based on angular acceleration of a carriage motor under acceleration control of the carriage and current values to be applied to the carriage motor under the acceleration control and constant speed control of the carriage; second program code means for calculating a stoppage current to be used for stopping the carriage at a target position based on the calculated inertia, an angular velocity of the motor under deceleration control of the carriage, the current value to be applied to the motor under the constant speed control of the carriage, and a stoppage constant $T_{BRK}$; and third program code means for stopping the carriage by applying the calculated stoppage current to the motor.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiments of the present invention will be described below.

Figure 4:
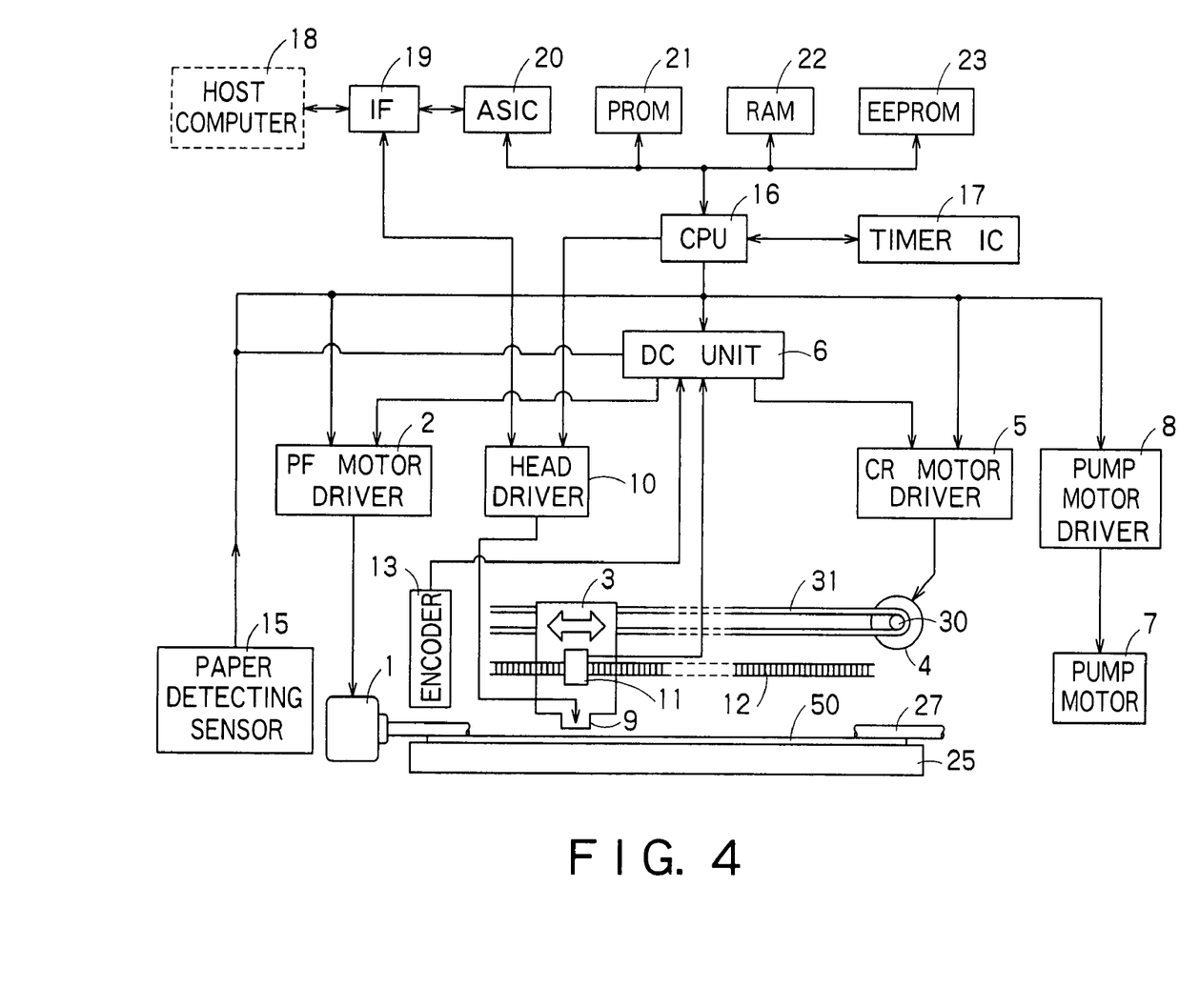
FIG. 4 is a block diagram schematically showing the construction of an ink jet printer.

First, the schematic construction and control of an ink jet printer, which uses a control unit for controlling a motor for use in a printer according to the present invention, will be described. The schematic construction of this ink jet printer is shown in FIG. 4.

This ink jet printer comprises: a paper feed motor (which will be also hereinafter referred to as a PF motor) 1 for feeding a paper; a paper feed motor driver 2 for driving the paper feed motor 1; a carriage 3; a carriage motor (which will be also hereinafter referred to as a CR motor) 4; a CR motor driver 5 for driving the carriage motor 4; a DC unit 6; a pump motor 7 for controlling the suction of ink for preventing clogging; a pump motor driver 8 for driving the pump motor 7; a recording head 9, fixed to the carriage 3, for discharging ink to a printing paper 50; a head driver 10 for driving and controlling the recording head 9; a linear type encoder 11 fixed to the carriage 3; a code plate 12 which has slits in regular intervals; a rotary type encoder 13 for use in the PF motor 1; a paper detecting sensor 15 for detecting the position of the rear edge of a paper which is being printed; a CPU 16 for controlling the whole printer; a timer IC 17 for periodically generating an interruption signal to output the signal to the CPU 16; an interface part (which will be also hereinafter referred to as an IF 19 for transmitting/receiving data to/from a host computer 18; an ASIC 20 for controlling the printing definition, the driving waveform of the recording head 9 and so forth on the basis of printing information which is fed from the host computer 18 via the IF 19; a PROM 21, RAM 22 and EEPROM 23 which are used as working and program storing regions for the ASIC 20 and the CPU 16; a platen 25 for supporting the paper 50 during print; a carrier roller 27, driven by the PF motor 1, for carrying the printing paper 50; a pulley 30 mounted on the rotating shaft of the CR motor 4; and a timing belt 31 driven by the pulley 30.

Furthermore, the DC unit 6 is designed to drive and control the paper feed motor driver 2 and the CR motor driver 5 on the basis of a control command, which is fed from the CPU 16, and the outputs of the encoders 11 and 13. In addition, each of the paper feed motor 1 and the CR motor 4 comprises a DC motor.

Figure 5:
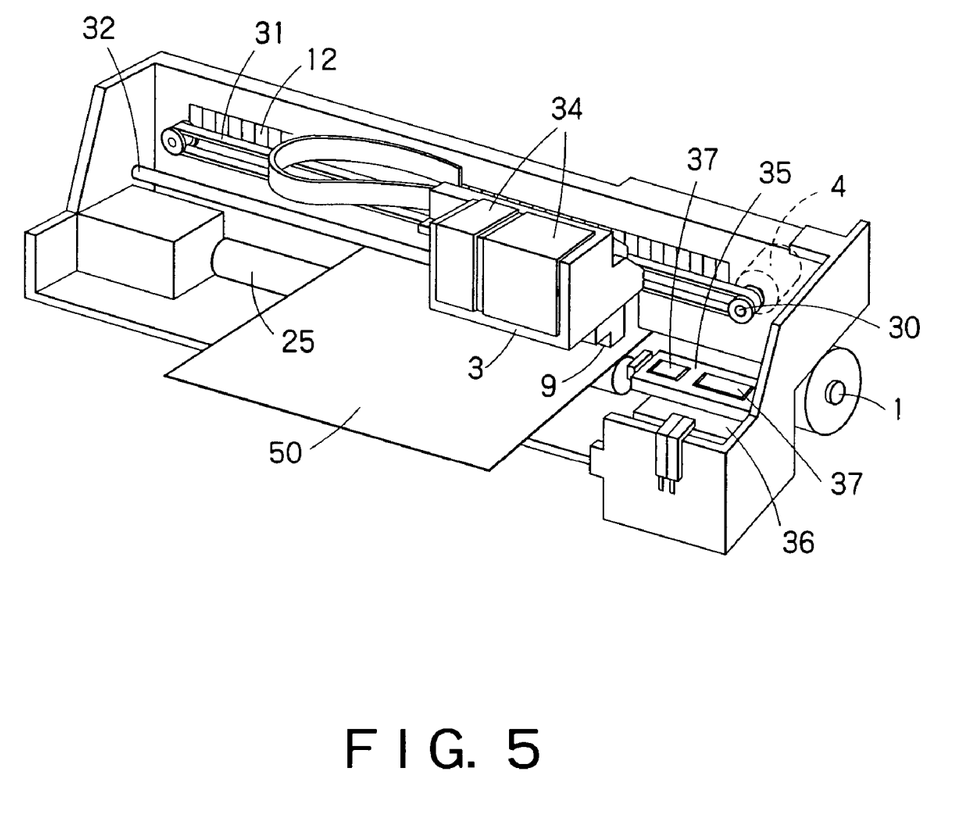
FIG. 5 is a perspective view showing the peripheral construction of a carriage.

The peripheral construction of the carriage 3 of this ink jet printer is shown in FIG. 5.

The carriage 3 is connected to the carriage motor 4 via the timing belt 31 and the pulley 30 to be driven so as to be guided by a guide member 32 to move in parallel to the platen 25. The carriage 3 is provided with the recording head 9 on the surface facing the printing paper. The recording head 9 comprises a nozzle row for discharging a black ink and a nozzle row for discharging color inks. Each nozzle is supplied with ink from an ink cartridge 34, and discharges drops of ink to the printing paper to print characters and/or images.

In a non-print region of the carriage 3, there are provided a capping unit 35 for sealing a nozzle opening of the recording head 9 during non-print, and a pump unit 36 having the pump motor 7 shown in FIG. 4. When the carriage 3 moves from a print region to the non-print region, the carriage 3 contacts a lever (not shown) to move the capping unit 35 upwards to seal the recording head 9.

When the nozzle opening row of the recording head 9 is clogged with ink, or when the cartridge 34 is exchanged or the like to force the recording head 9 to discharge ink, the pump unit 36 is operated in the sealed state of the recording head 9, to suck ink out of the nozzle opening row by a negative pressure from the pump unit 36. Thus, dust and paper powder adhering to a portion near the nozzle opening row are cleaned. Moreover, bubbles of the recording head 9, together with ink, are discharged to a cap 37.

Figure 6:
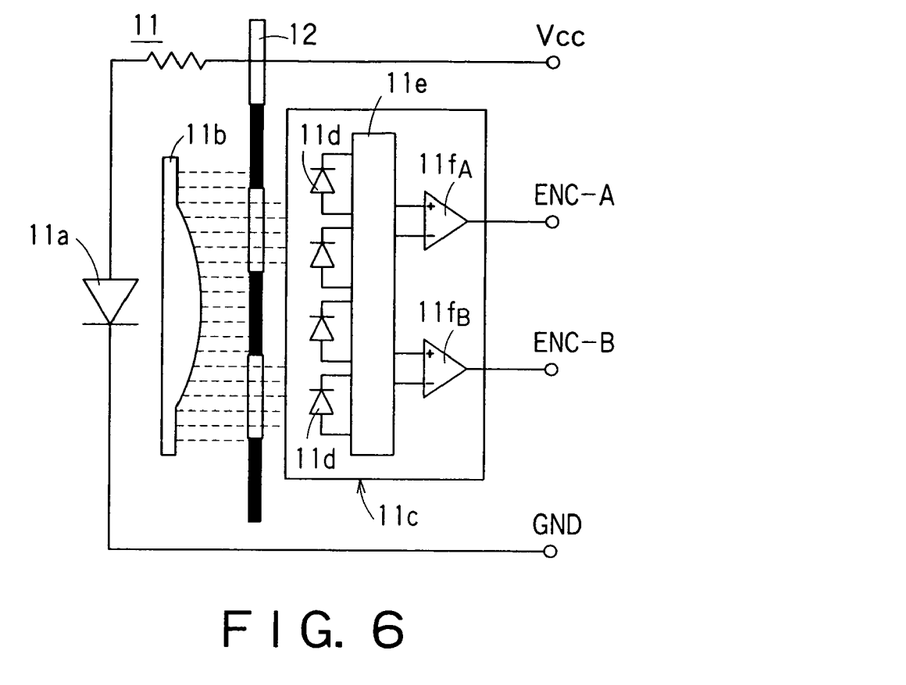
FIG. 6 is a schematic view showing the construction of a linear type encoder.

Then, the construction of the linear type encoder 11 mounted on the carriage 3 is shown in FIG. 6. This encoder 11 comprises a light emitting diode 11a, a collimator lens 11b, and a detection processing part 11c. The detection processing part 11c has a plurality of (four) photodiodes 11d, a signal processing circuit 11e, and two comparators $11f_A$ and $11f_B$.

If a voltage Vcc is applied between both ends of the light emitting diode 11a via a resistor, light rays are emitted from the light emitting diode 11a. The light rays are collimated by the collimator lens 11b to pass through the code plate 12. The code plate 12 is provided with slits at regular intervals (e.g., every 1/180 inches (=1/180×2.54 cm)).

The parallel rays passing through the code plate 12 are incident on each of the photodiodes 11d via a fixed slit (not shown), and converted into electric signals. The electric signals outputted from the four photodiodes 11d are processed by the signal processing circuit 11e. The signals outputted from the signal processing circuit 11e are compared by the comparators $11f_A$ and $11f_B$, and the compared results are outputted as pulses. The pulses ENC-A and ENC-B outputted from the comparators $11f_A$ and $11f_B$ are outputs of the encoder 11.

Figure 7:
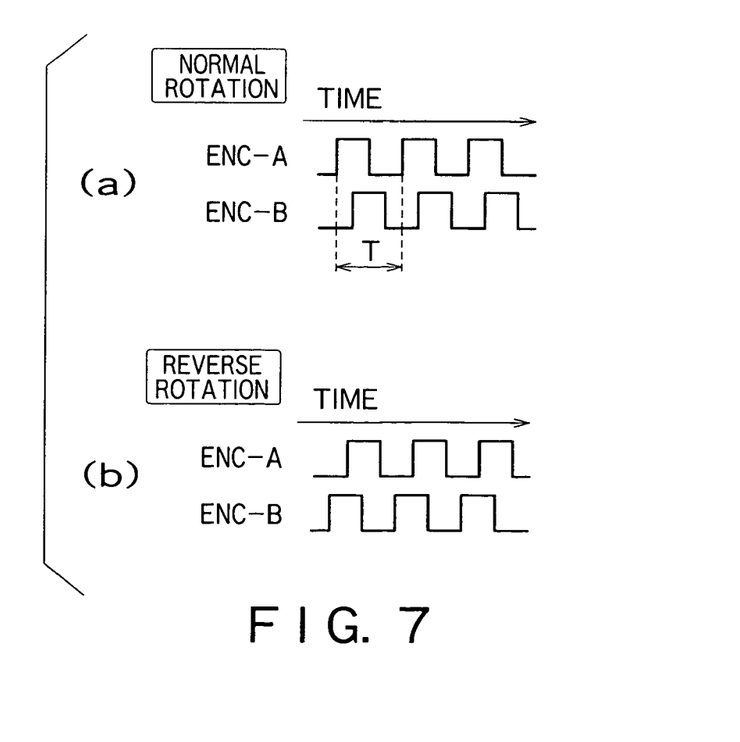
FIGS. 7(a) and 7(b) are waveform illustrations of output pulses of an encoder.

The phase of the pulse ENC-A is different from the phase of the pulse ENC-B by 90 degrees. The encoder 4 is designed so that the phase of the pulse ENC-A is advanced from the pulse ENC-B by 90 degrees as shown in FIG. 7(a) when the CR motor 4 is normally rotating, i.e., when the carriage 3 is moving a main scanning direction, and the phase of the pulse ENC-A lags behind the pulse ENC-B by 90 degrees as shown in FIG. 7(b) when the CR motor 4 is reversely rotating. One period T of the pulses corresponds to the distance between adjacent slits of the code plate 12 (e.g., 1/180 inches (=1/180×2.54 cm)). This is equal to a period of time, in which the carriage 3 moves between the adjacent slits.

On the other hand, the rotary type encoder 13 for use in the PF motor 1 has the same construction as that of the linear type encoder 11, except that the code plate is a rotating disk which rotates in accordance with the rotation of the PF motor 1. Furthermore, in the ink jet printer, the distance between adjacent slits of a plurality of slits provided in the code plate of the encoder 13 for use in the PF motor is 1/180 inches (1/180×2.54 cm). When the PF motor 1 rotates by the distance between adjacent slits, the paper is fed by 1/1440 inches (=1/1440×2.54 cm).

Figure 8:
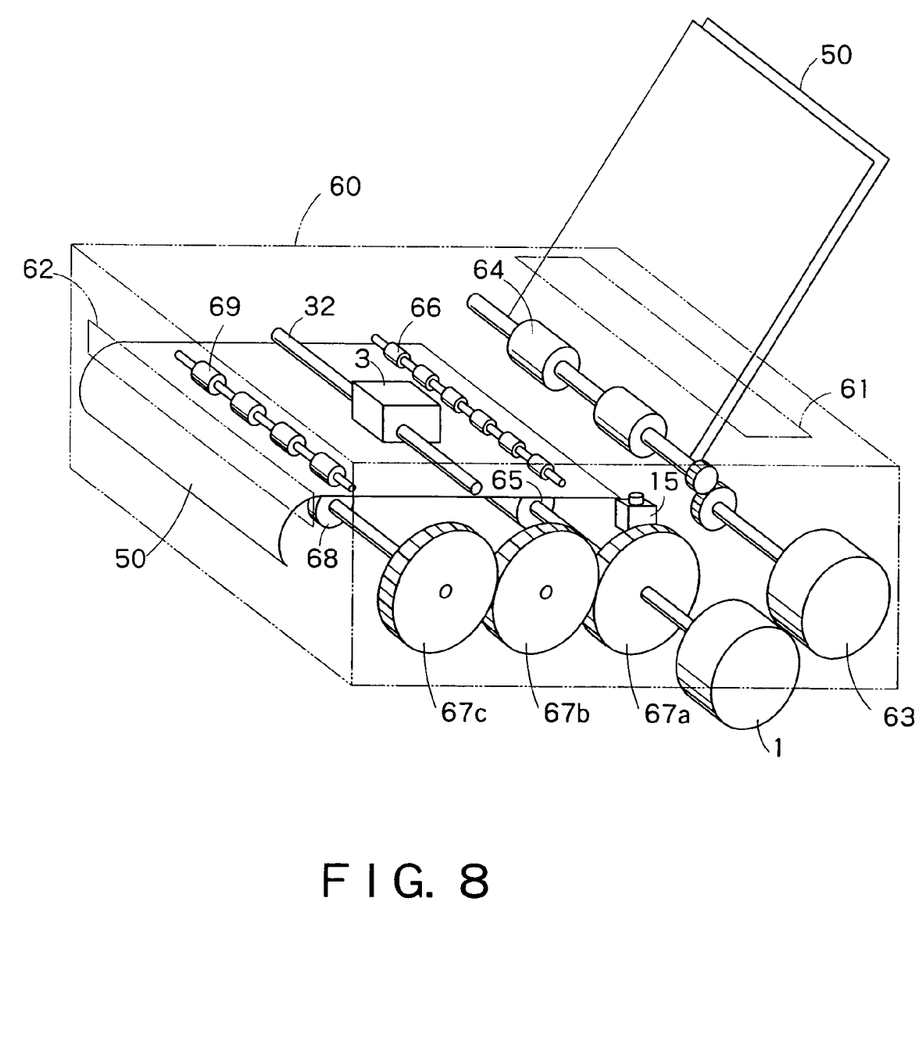
FIG. 8 is a schematic perspective view of a printer for explaining the position of a paper detecting sensor.

Referring to FIG. 8, the position of the paper detecting sensor 15 shown in FIG. 4 will be described below.

In FIG. 8, the paper 10 inserted into a paper feeding port 61 of a printer 60 is fed into the printer 60 by means of a paper feeding roller 64 which is driven by a paper feeding motor 63. The front edge of the paper 50, which has been fed into the printer 60, is detected by, e.g., an optical paper detecting sensor 15. The paper 50, the front edge of which has been detected by the paper detecting sensor 15, is fed by means of a paper feed roller 65 and a driven roller 66 which are driven by the PF motor 1.

Subsequently, ink drops from the recording head (not shown), which is fixed to the carriage 3 moving along the carriage guide member 32, to carry out a print. Then, when the paper is fed to a predetermined position, the rear edge of the paper 50, which is currently being printed, is detected by the paper detecting sensor 15. Then, a gear 67c is driven, via a gear 67b, by means of a gear 67a which is driven by the PF motor 1. Thus, a paper discharging roller 68 and a driven roller 69 are rotated to discharge the printed paper 50 from a paper discharging port 62 to the outside.

(First Preferred Embodiment)

Figure 1:
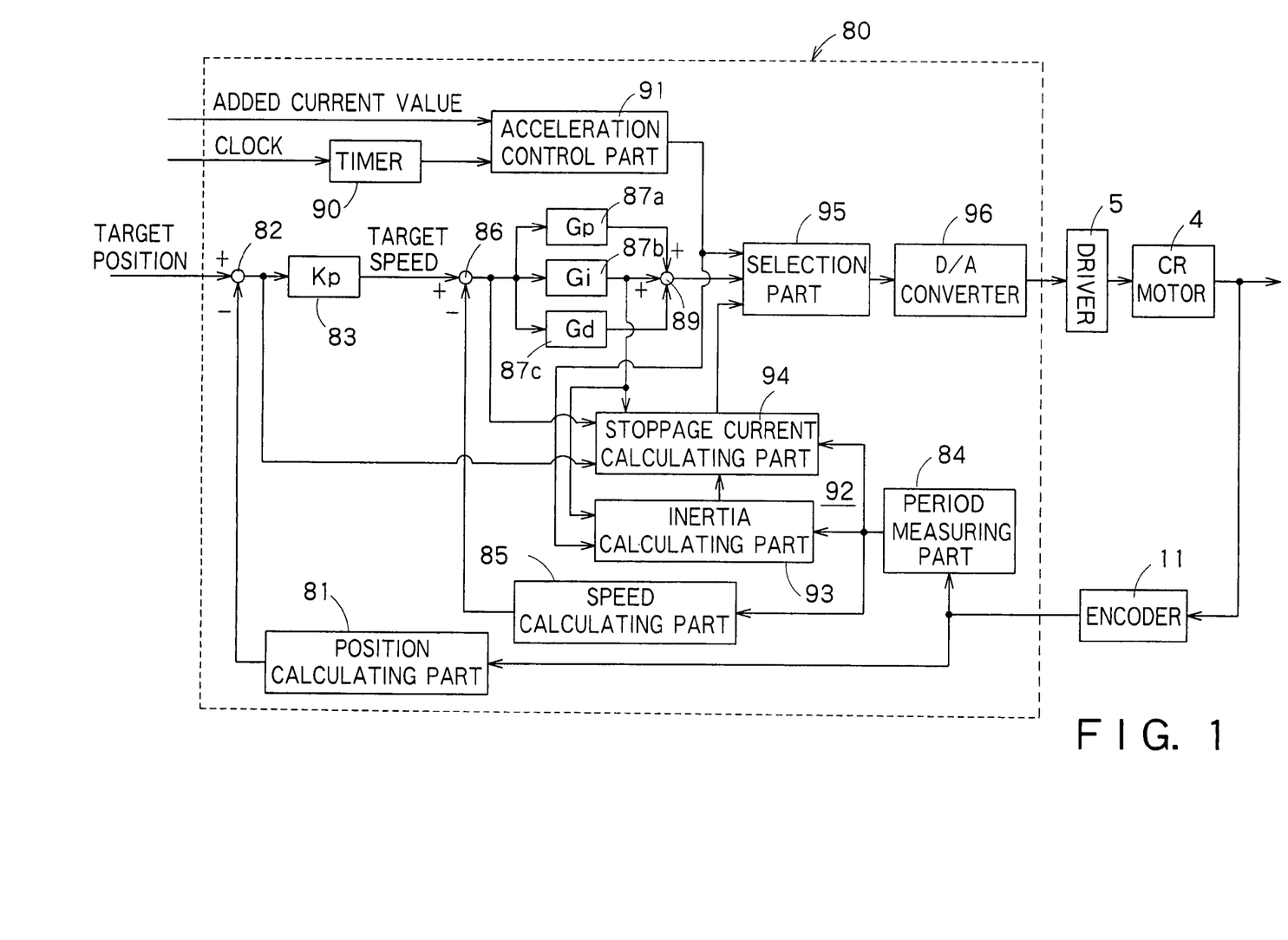
FIG. 1 is a block diagram showing the construction of a preferred embodiment of a control unit for controlling a motor for use in a printer according to the present invention.

The construction of the first preferred embodiment of a control unit for controlling a motor for use in a printer according to the present invention is shown in FIG. 1. A controller 80 in this embodiment is used for controlling the carriage motor 4 (a DC motor) of the ink jet printer, and installed in the DC unit 6 explained with reference to FIG. 4.

The controller 80 comprises a position calculating part 81, a subtracter 82, a target speed calculating part 83, a period measuring part 84, a speed calculating part 85, a subtracter 86, a proportional element 87a, an integrating element 87b, a differentiating element 87c, an adder 89, a timer 90, an acceleration control part 91, a stoppage control part 92 having an inertia calculating part 93 and a stoppage current calculating part 94, a selection part 95 and a D/A converter 96.

The position calculating part 81 is designed to detect the leading and trailing edges of each of the output pulses ENC-A and ENC-B of the encoder 11 to count the number of the detected edges, and to calculate the position of the carriage 3 on the basis of the counted value. In this counting, when the CR motor 4 is normally rotating, if one edge is detected, "1" is added, and when the CR motor 4 is reversely rotating, if one edge is detected, "−1" is added. Each of the periods of the pulses ENC-A and ENC-B is equal to the distance between adjacent slits of the code plate 12, and the phase of the pulse ENC-A is different from the phase of the pulse EN C-B by 90 degrees. Therefore, the counted value "1" in the above described counting corresponds to ¼ of the distance between adjacent slits of the code plate 12. Thus, if the counted value is multiplied by ¼ of the distance between adjacent slits, it is possible to obtain the moving amount of the carriage 3 from a position corresponding to a counted value "0". At this time, the definition of the encoder 11 is ¼ of the distance between adjacent slits of the code plate 12. If the distance between adjacent slits is 1/180 inches (=1/180× 2.54 cm), the definition is 1/720 inches (=1/720)×2.54 cm).

The subtracter 82 is designed to calculate a position deviation of the actual position of the carriage 3, which is obtained by the position calculating part 81, from a target position which is fed from the CPU 16.

The target speed calculating part 83 is designed to calculate a target speed of the carriage 3 on the basis of the position deviation which is the output of the subtracter 82. This operation is carried out by multiplying the position deviation by a gain $K_p$. This gain $K_p$ is determined in accordance with the position deviation. Furthermore, the value of the gain $K_p$ may be stored in a table (not shown).

The target speed calculating part 83 continuously outputs a predetermined value Vs in a deceleration range for stoppage until the calculated speed reaches the value Vs or less to stop the CR motor 4. The period measuring part 84 measures a period of each output pulse ENC-A of the encoder 11, for example, from the leading to trailing edges of the output pulse ENC-A by a timer counter (not shown).

The speed calculating part 85 calculates a speed of the carriage 3 based on the output of the period measuring part 84. A speed of the carriage 3 is calculated as λ/T in which λ is the distance between the slits of the code plate 12, and T is one period of the output of the period measuring part 84, or each output pulse ENC-A of the encoder 11.

The subtracter 86 is designed to calculate a speed deviation of the actual speed of the carriage 3, which is calculated by the speed calculating part 85, from a target speed.

The proportional element 87a is designed to multiply the speed deviation by a constant Gp to output the multiplied result. The integrating element 87b is designed to integrate a value which is obtained by multiplying the speed deviation by a constant Gi. The differentiating element 87c is designed to multiply a difference between the current speed deviation and the last speed variation by a constant Gd to output the multiplied result. Furthermore, the operations in the proportional element 87a, integrating element 87b and differentiating element 87c are carried out every one period of the output pulse ENC-A of the encoder 11, i.e., in synchronism with the leading edge of the output pulse ENC-A.

The outputs of the proportional element 87a, integrating element 87b and differentiating element 87c are added by the adder 89. Then, the added result is fed to the selection part 95.

In addition, the timer 90 and the acceleration control part 91 are used for controlling acceleration, and the PID control using the proportional element 87a, integrating element 87b and differentiating element 87c is used for controlling the constant speed and deceleration during acceleration. The stoppage control part 92 is used for stoppage controlling.

The timer 90 is designed to generate a timer interruption signal for every predetermined time on the basis of a clock signal which is fed from the CPU 16.

The acceleration control part 91 is designed to integrate a predetermined current value (e.g., 20 mA) into a target current value every time it receives the timer interruption signal, and to feed the integrated result, i.e., the target current value of the DC motor 4 during acceleration, to the selection part 95.

The acceleration control part 91 feeds a command signal to the inertia calculating part 92 when the target current value reaches a predetermined value Iacc.

Figure 2:
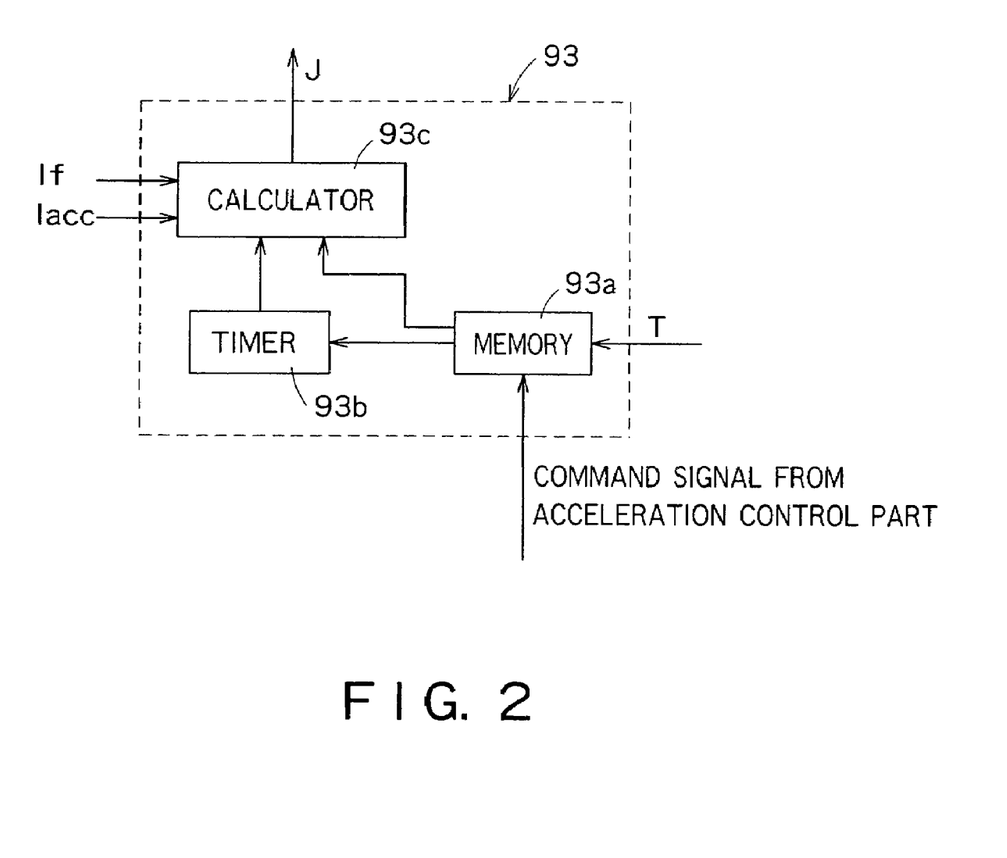
FIG. 2 is a block diagram showing the construction of an inertia calculating part of the control unit according to the present invention.

As shown in FIG. 2, the inertia calculating part 93 has, for example, a memory 93a, timer 93b and a calculator 93c. The inertia calculating part 93 calculates inertia J (including inertia of an ink cartridge) of the carriage 3 based on the output of the period measuring part 84, the output of the acceleration control part 91, and also the output of the integrating element 87b.

After receiving the command signal from the acceleration control part 91, the memory 93a stores the second period $T_2$ and the K-th period $T_K$ (K≧3) fed from the period measuring part 84. The periods $T_2$ and $T_K$ are the values while the acceleration control part 91 is outputting the predetermined value Iacc. The subscript K is predetermined according to control.

The timer 93b counts a period of time $T_t$ from reception of the second period $T_2$ to the K-th period $T_K$. Instead of counting, a period $T_i$ (i=2, ..., K) from the second to the K-th can be integrated as $$T_t = T3 + \ldots + T_k.$$

The calculator 93c calculates the inertia J of the carriage 3 according to the equation (1) based on the values Iacc, $T_2$, $T_K$ and $T_t$, and also an output If of the integrating element 87b, which is the output just before the moment the carriage 3, or the CR motor 4 is in transition from the constant speed range to the deceleration range.

$$J = \frac{I_{acc} - I_f}{\frac{\Delta \omega}{\omega t}} \tag{1}$$

$$= \frac{I_{acc} - I_f}{\frac{\left(\frac{a}{T_k} - \frac{a}{T_2}\right)}{T_2 + T_1}}$$

In the equation (1), ω and α represent an angular velocity of the CR motor 4 and a constant for obtaining the angular velocity, respectively, the numerator indicates subtraction of a friction component $I_f$ from a torque (a drive current Icc), and the denominator indicates the rate of change in angular velocity of the CR motor 4, or angular acceleration.

The stoppage current calculating part 94 calculates a current value $I_{STOP}$ to be applied to the CR motor 4 for stopping the carriage at the target position according to the equation (2) based on the output $T_f$ of the period measuring part 84, the output $I_f$ of the integrating element 87b in transition from the constant speed to deceleration ranges, the output of the subtracter 82, and also the output J of the inertia calculating part 93 when the output of the subtracter 86 is decreased to a predetermined value or less while the target speed calculating part 83 is outputting a predetermined value $V_s$.

$$I_{stop} = I_f - \frac{\frac{a}{T_f}}{T_{BRK}} \cdot J \tag{2}$$

The resultant current value $I_{STOP}$ is supplied to the selection part 95.

In the equation (2), α is a constant for obtaining an angular velocity of the CR motor 4, $T_{BRK}$ is called a stoppage constant that is decided by the stoppage current calculating part 94 based on the output of the subtracter 82 just before stoppage control, or a positional deviation, and the output $I_f$ of the integrating element 87b. The value $T_{BRK}$ is preferably stored on a table, and is obtained by experiment for achieving smaller stoppage positional error. The current value $I_{STOP}$ is a forward current if the value is positive, while it is a reverse current if negative.

The selection part 95 selects either the output of the acceleration control part 91 under acceleration control, the output of the adder 89 at a constant speed under acceleration and under deceleration control, or the output of the stoppage current calculating part 94 under stoppage control. The selected output is supplied to the D/A converter 96.

The output of the selection part 95 is converted into an analog current by the D/A converter 96. On the basis of this analog current, the CR motor 4 is driven by the driver 5.

The driver 5 has, e.g., four transistors. By turning each of the transistors ON and OFF on the basis of the output of the D/A converter 96, the driver 5 can be selectively in (a) an operation mode in which the CR motor 4 is normally or reversely rotated, (b) a regenerative brake operation mode (a short brake operation mode, i.e., a mode in which the stopping of the CR motor is maintained), or (c) a mode in which the CR motor is intended to be stopped.

Referring to FIGS. 3(a) and 3(b), the operation of the controller 80 will be described below.

If a start-up command signal for starting the CR motor 4 is fed from the CPU 16 to the controller 80 of the DC unit 6 when the CR motor 4 is stopped, a start-up initial current value $I_o$ is fed from the acceleration control part 91 to the D/A converter 96 via the selection part 95. Furthermore, this start-up initial current value $I_o$, together with the start-up command signal, is fed from the CPU 16 to the acceleration control part 91. Then, this current value $I_o$ is converted into an analog current by the D/A converter 96 to be fed to the driver 5, and the CR motor is started up by the driver 5 (see FIG. 3(a), 3(b)).

After the start-up command signal is received, the timer 90 generates a timer interruption signal for every predetermined time. Every time the acceleration control part 91 receives the timer interruption signal, the acceleration control part 91 integrates a predetermined current value (e.g., 20 mA) into the start-up initial current value $I_o$, to feed the integrated current value to the D/A converter 96 via the selection part 95. Then, the integrated current value is converted into an analog current by the D/A converter 96 to be fed to the driver 5. Then, the CR motor is driven by the driver 5 so that the value of the current supplied to the CR motor 4 is the integrated current value, so that the speed of the CR motor 4 increases (see FIG. 3(b)). Therefore, the current value supplied to the CR motor is step-wise as shown in FIG. 3(a).

Furthermore, at this time, although the PID control system also operates, the selection part 95 selects and incorporates the output of the acceleration control part 91.

Figure 3:
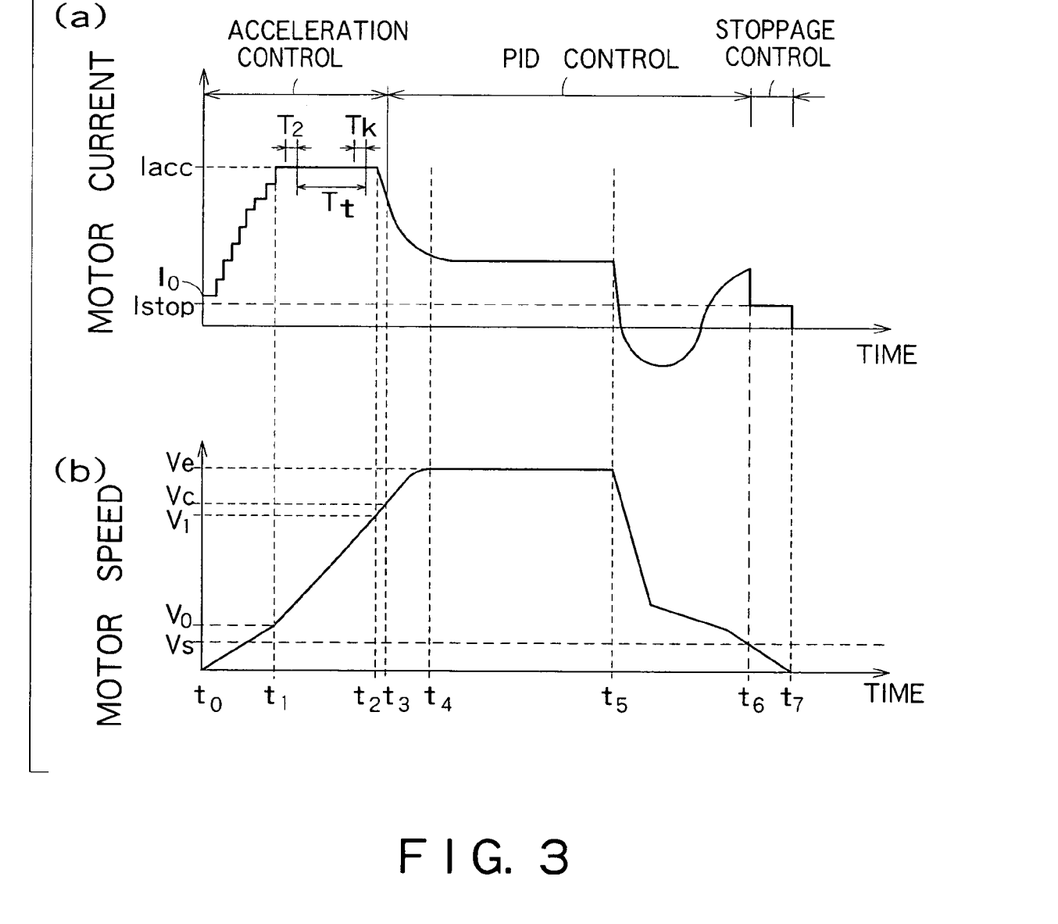
FIGS. 3(a) and 3(b) are waveform illustrations of the embodiment shown in FIG. 1.

The integration of the current value in the acceleration control part 91 is carried out until the speed of the CR motor 4 reaches a speed $V_0$. When a current value integrated at time $t_1$ reaches the predetermined value Iacc, the acceleration control part 91 halts the integration operation, and feeds the constant current value Iacc to the D/A converter 96 via the selection part 95 so that the driver 5 drives the CR motor 4 with the current value Iacc applied thereto (see FIG. 3($a$)). During this process, the acceleration control part 91 sends a command signal to the inertia calculating part 93. After receiving the command signal, the memory 93$a$ stores the second period $T_2$ and the K-th period $T_K$ (K≧3) fed from the period measuring part 84. The timer 93$b$ measures a period of time $T_t$ from the reception of the second period $T_2$ to the K-th period $T_K$.

Then, in order to prevent the speed of the CR motor 4 from overshooting, the acceleration control part 91 controls the CR motor 4 so as to reduce the current, which is supplied to the CR motor 4, when the speed of the CR motor 4 becomes a predetermined speed $V_1$ (see time $t_2$). At this time, the speed of the CR motor 4 further increases. However, when the speed of the CR motor 4 reaches a predetermined speed $V_C$ (see time $t_3$ in FIG. 3($b$)), the selection part 95 selects the output of the PID control system, i.e., the output of the adder 89, to carry out the PID control.

That is, the target speed is calculated on the basis of the position deviation of the actual position, which is obtained from the output of the encoder 11, from the target position. In addition, the proportional element 87$a$, integrating element 87$b$ and differentiating element 87$c$ are operated on the basis of the speed deviation of the actual speed, which is obtained from the output of the encoder 11, from the target speed to carry out the proportional, integrating and differentiating operations. Moreover, the CR motor 4 is controlled on the basis of the sum of these calculated results. Furthermore, the above described proportional, integrating and differentiating operations are carried out in synchronism with, e.g., the leading edge of the output pulse ENC-A of the encoder 11. Thus, the speed of the DC motor 4 is controlled so as to be a desired speed $V_e$. Furthermore, the predetermined speed $V_C$ is preferably a value of 70% to 80% of the desired speed $V_e$.

Since the speed of the DC motor 4 is the desired speed $V_e$ after time $t_4$, a printing processing can be carried out. When the printing processing is completed and when the carriage 3 reaches the target position (see time $t_5$ in FIG. 3($b$)), deceleration control is performed by PID control system. Moreover, the output $I_f$ of the integration element 87$b$ just before the deceleration control is fed to the inertia calculating part 93 for calculation of the inertia J of the carriage 3 having the rotary section of the CR motor 4.

When a target speed calculated by the target speed calculating part 83 reaches the predetermined value $V_s$ or less by the deceleration control, the target speed calculating part 83 continuously outputs the predetermined value $V_s$.

When the deviation of an actual speed from the predetermined value $V_s$ reaches a predetermined value or less (see time $t_6$), the stoppage current calculating part 94 calculates the current value $I_{STOP}$ to be applied to the CR motor 4 according to the equation (2) for stopping the carriage at the target position. The current value $I_{STOP}$ is fed to the D/A converter 96 via the selection part 95 so that the driver 5 drives the CR motor 4 with the current value $I_{STOP}$ to stop the CR motor 4, or the carriage 3 at the target position (see time $t_7$ in FIG. 3($b$)).

As disclosed above, this embodiment achieves a rapid and precise stoppage of the carriage 3 at the target position.

The embodiment employs the carriage driven by the DC motor as an object to be controlled. The present invention can, however, be applied to paper feeding.

One inertia calculation is usually executed for each one pass (one main scanning operation during printing process). However, this is not a must, and it is preferable that an inertia calculation is executed based on data necessary for the calculation, which have been stored at timing, such as, just before stoppage that will not affect encoder periods.

The calculated inertia is used not only for stoppage control but also for judging the status of the printing drive section to control the drive section in a desired status. Moreover, inertia can be updated at any timing, such as, per page, after cleaning, and so on. Inertia calculation may be conducted, however, inertia that is updated for the first time after same change has occurred in the former inertia can be used.

(Second Preferred Embodiment)

Figure 9:
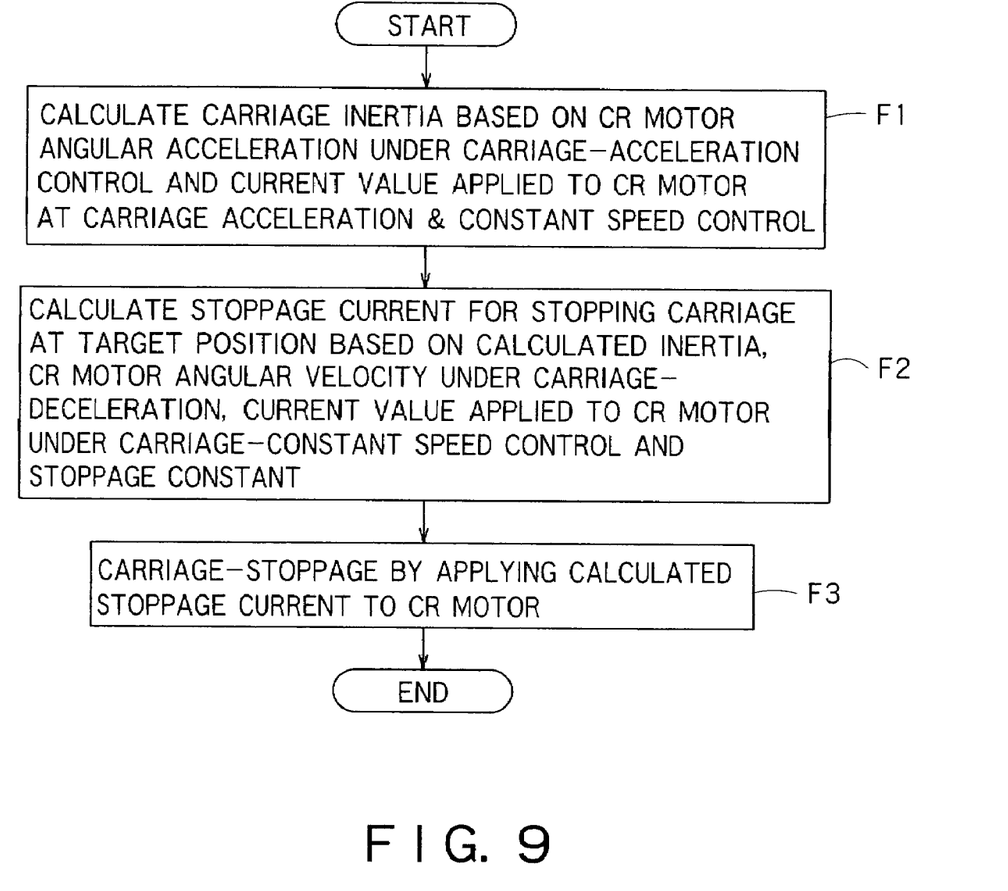
FIG. 9 is a flow chart showing a control procedure in a method for controlling a motor for use in a printer according to the present invention.

The second preferred embodiment will be disclosed with reference to FIG. 9. The second embodiment is a method of controlling a motor for use in a printer. A control procedure is shown in FIG. 9.

Firstly, inertial of the carriage 3 is calculated based on angular acceleration of the CR motor 4 under carriage acceleration control, and current values applied to the CR motor 4 under carriage acceleration and constant speed control (see step F1 in FIG. 9).

Calculated next is a stoppage current for stopping the carriage 3 at the target position based on the calculated inertia, an angular velocity of the CR motor 4 at carriage deceleration, a current value applied to the CR motor 4 under carriage constant control, and the stoppage constant $T_{BRK}$ (see step F2 in FIG. 9).

The calculated stoppage current is then applied to the CR motor 4 for carriage stoppage (see step F3 in FIG. 9).

The steps F2 and F3 in FIG. 9 are the steps for controlling a current applied to the CR motor 4 with the calculated inertia.

As disclosed above, according to the second embodiment, a stoppage current is calculated according to inertia of the carriage 3 and the CR motor 4 is controlled based on the calculated stoppage current, thus achieving rapid and precise carriage stoppage at the target position.

(Third Preferred Embodiment)

Figure 10:
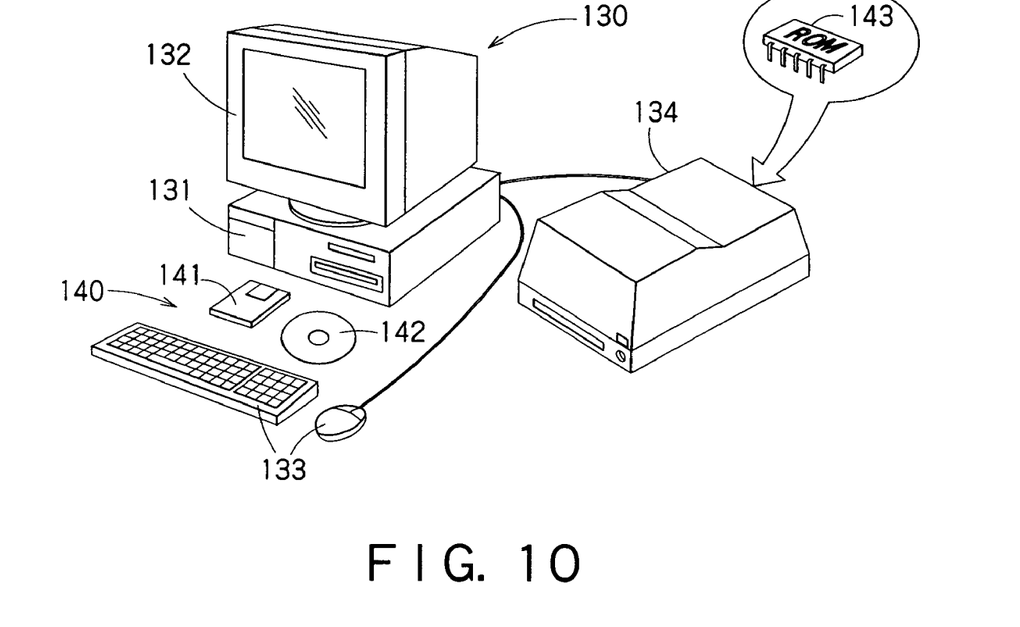
FIG. 10 is a perspective view showing an example of a computer system using a storage medium, in which a print control program has been recorded, according to the present invention.
Figure 11:
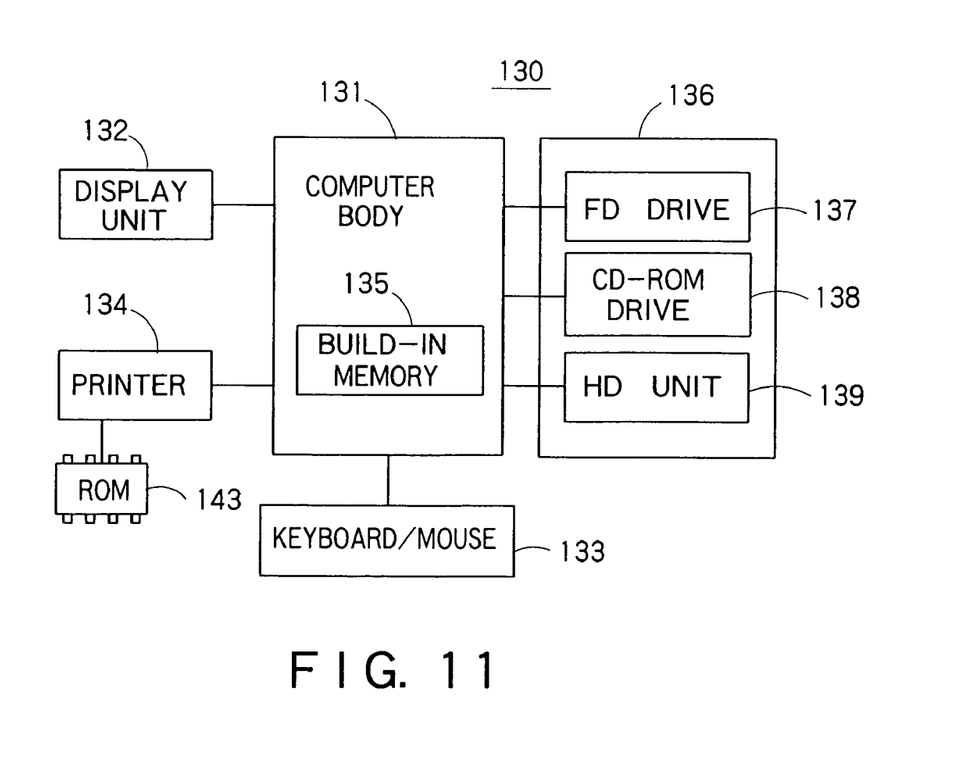
FIG. 11 is a block diagram showing an example of a computer system using a storage medium, in which a print control program has been recorded, according to the present invention.

Referring to FIGS. 10 and 11, the third preferred embodiment of the present invention will be described below. This preferred embodiment relates to a storage medium, in which a control program for controlling a motor for use in a printer has been stored. FIGS. 10 and 11 are a perspective view and block diagram showing an example of a computer system 130 which uses a storage medium, in which a print control program in this preferred embodiment has been recorded.

In FIG. 10, the computer system 130 comprises a computer body 130 including a CPU, a display unit 132, such as a CRT, an input unit 133, such as a keyboard or mouse, and a printer 134 for carrying out a print.

As shown in FIG. 11, the computer body 131 comprises an internal memory 135 of a RAM, and a built-in or exterior memory unit 136. As the memory unit 136, a flexible or floppy disk (FD) drive 137, a CD-ROM drive 138 and a hard disk drive (HD) unit 139 are mounted. As shown in FIG. 10, a flexible disk or floppy disk (FD) 141 which is inserted into a slot of the FD drive 137 to be used, a CD-ROM 142 which is used for the CD-ROM drive 138, or the like is used as a storage medium 140 for use in the memory unit 136.

As shown in FIGS. 10 and 11, it is considered that the FD 141 or the CD-ROM 142 is used as the storage medium for use in a typical computer system. However, since this preferred embodiment relates to a control program for controlling a motor for use in the printer 134, the control program of the present invention may be recorded in, e.g., a ROM chip 143 serving as a nonvolatile memory which is built in the printer 134. Of course, the storage medium may be any one of FDs, CD-ROMs, MOs (Magneto-Optical) disks, DVDs (Digital Versatile Disks), other optical recording disks, card memories, and magnetic tapes.

The storage medium 140 in this preferred embodiment is designed to store a control program of a control procedure including steps F1 through F3 shown in FIG. 9. That is, the storage medium 140 in this preferred embodiment may store storing control program code for controlling a motor for use in a printer, including: a first program code for calculating inertia of a carriage based on angular acceleration of a carriage motor under acceleration control of the carriage and current values to be applied to the carriage motor under the acceleration control and constant speed control of the carriage; a second program code for calculating a stoppage current to be used for stopping the carriage at a target position based on the calculated inertia, an angular velocity of the motor under deceleration control of the carriage, the current value to be applied to the motor under the constant speed control of the carriage, and a stoppage constant $T_{BRK}$; and a third program code for stopping the carriage by applying the calculated stoppage current to the motor.

As disclosed above, the present invention achieves rapid and precise stoppage of an object to be controlled.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A control unit for controlling a carriage motor for use in a printer, comprising:
   a speed control part to control a carriage that is driven by the motor by acceleration control, constant speed control, deceleration control, and stoppage control by controlling a current to be applied to the motor; and
   an inertia calculating part to calculate inertia of the carriage based on angular acceleration of the motor under the acceleration control of the carriage, and current values to be applied to the motor under the acceleration control and the constant speed control of the carriage, the calculated inertia being used by the speed control part for controlling the current to be applied to the motor, and the inertia calculating part executing an inertia calculation based on data necessary for the calculation, which have been stored at timing, just before stoppage.

2. A control unit for controlling a carriage motor for use in a printer, as set forth in claim 1, further comprising a stoppage current calculating part to calculate a stoppage current to be used for stopping the carriage at a target position based on the calculated inertia, an angular velocity of the motor under the deceleration control of the carriage, the current value of the motor under the constant speed control of the carriage, and a stoppage constant $T_{BRK}$, the speed control part performing control of stopping the carriage by applying the calculated stoppage current.

3. A control unit for controlling a carriage motor for use in a printer, as set forth in claim 2, wherein a predetermined current value Iacc is applied to the motor in a constant current acceleration range under the acceleration control for accelerating the carriage, the inertia calculation part calculating angular acceleration $\Delta\omega/\Delta t$ in the constant current acceleration range, and calculating inertia J of the carriage based on the angular acceleration $\Delta\omega/\Delta t$, a current value $I_f$ to be applied to the motor under the constant speed control of the carriage, and the current value Iacc.

4. A method of controlling a carriage motor for use in a printer, comprising:
   calculating inertia of a carriage to be driven by the motor based on angular acceleration of the motor under acceleration control of the carriage, and current values to be applied to the motor under the acceleration control and a constant speed control of the carriage, the inertia calculation being executed based on data necessary for the calculation, which have been stored at timing, just before stoppage; and
   controlling a current to be applied to the motor by means of the calculated inertia.

5. A method of controlling a carriage motor for use in a printer, as set forth in claim 4, wherein the controlling of the current includes:
   calculating a stoppage current to be used for stopping the carriage at a target position based on the calculated inertia, an angular velocity of the motor under deceleration control of the carriage, the current value of the motor under the constant speed control of the carriage, and a stoppage constant $T_{BRK}$; and
   stopping the carriage by applying the calculated stoppage current to the motor.

6. A method of controlling a carriage motor for use in a printer, as set forth in claim 4, wherein the printer is a serial printer.

7. A control unit for controlling a motor for use in a printer, comprising:
   a speed control part to control an object that is driven by the motor by acceleration control, constant speed control, deceleration control, and stoppage control by controlling a current to be applied to the motor; and
   an inertia calculating part to calculate inertia of the object based on angular acceleration of the motor under the deceleration control of the object, and current values to be applied to the motor under the acceleration control and the constant speed control of the object, during the deceleration control after a printing processing is completed, the calculated inertia being used by the speed control part for controlling the current to be applied to the motor,
   wherein the inertia calculating part executes an inertia calculation based on data necessary for the calculation, which have been stored at timing, just before stoppage.

8. A control unit for controlling a motor for use in a printer, as set forth in claim 7, further comprising a stoppage current calculating part to calculate a stoppage current to be used for stopping the object at a target position based on the calculated inertia, an angular velocity of the motor under the deceleration control of the object, the current value of the motor under the constant speed control of the object, and a stoppage constant $T_{BRK}$, the speed control part performing control of stopping the object by applying the calculated stoppage current.

9. A control unit for controlling a motor for use in a printer, as set forth in claim 8, wherein a predetermined current value Iacc is applied to the motor in a constant current acceleration range under the acceleration control for accelerating the object, the inertia calculation part calculating angular acceleration $\Delta\omega/\Delta t$ in the constant current acceleration range, and calculating inertia J of the object based on the angular acceleration $\Delta\omega/\Delta t$, a current value $I_f$ to be applied to the motor under the constant speed control of the object, and the current value Iacc.

10. A control unit for controlling a motor for use in a printer, as set forth in claim 9, wherein the current value $I_f$ corresponds to a speed of the object under constant speed control just before a transition from the constant speed control to the deceleration control.

11. A control unit for controlling a motor for use in a printer, as set forth in claim 8, wherein the stoppage current calculating part uses an angular velocity under deceleration control just before a transition from the deceleration control to the stoppage control, as the angular velocity of the motor.

12. A control unit for controlling a motor for use in a printer, as set forth in claim 8, wherein the stoppage constant $T_{BRK}$ is decided based on the current value to be applied to the motor under the constant speed control and a positional deviation of an actual position of the motor from the target position.

13. A control unit for controlling a motor for use in a printer, as set forth in claim 7, further comprising a period measuring part to measure a period of each output pulse of an encoder that rotates in accordance with rotation of the motor, the angular acceleration and the angular velocity of the motor being calculated based on the output of the period measuring part.

14. A control unit for controlling a motor for use in a printer, as set forth in claim 7, wherein the motor is a carriage motor for driving a carriage.

15. A method of controlling a motor for use in a printer, comprising:
    calculating inertia of an object to be driven by the motor based on angular acceleration of the motor under deceleration control of the object, and current values to be applied to the motor under acceleration control and a constant speed control of the object, the inertia calculation is being executed based on data necessary for the calculation, which have been stored at timing, just before stoppage; and
    controlling a current to be applied to the motor by means of the calculated inertia.

16. A method of controlling a motor for use in a printer, as set forth in claim 15, wherein the controlling of the current includes:
    calculating a stoppage current to be used for stopping the object at a target position based on the calculated inertia, an angular velocity of the motor under the deceleration control of the object, the current value of the motor under the constant speed control of the object, and a stoppage constant $T_{BRK}$; and
    stopping the object by applying the calculated stoppage current to the motor.

17. A method of controlling a motor for use in a printer, as set forth in claim 15, wherein the object is a carriage of a serial printer.

18. A computer-readable storage medium storing control program code for controlling a motor for use in a printer, comprising;
    first program code means for calculating inertia of a carriage based on angular acceleration of a carriage motor under deceleration control of the carriage and current values to be applied to the carriage motor under acceleration control and constant speed control of the carriage, the inertia calculation being executed based on data necessary for the calculation, which have been stored at timing, just before stoppage;
    second program code means for calculating a stoppage current to be used for stopping the carriage at a target position based on the calculated inertia, an angular velocity of the motor under deceleration control of the carriage, the current value to be applied to the motor under the constant speed control of the carriage, and a stoppage constant $T_{BRK}$; and
    third program code means for stopping the carriage by applying the calculated stoppage current to the motor.

* * * * *